(12) United States Patent
Miller et al.

(10) Patent No.: US 8,316,631 B2
(45) Date of Patent: Nov. 27, 2012

(54) EXHAUST PLUME HEAT EFFECT REDUCING METHOD AND APPARATUS

(75) Inventors: Daniel N. Miller, Bainbridge Island, WA (US); Neal D. Domel, Aledo, TX (US); Cole W. Schemm, Willow Park, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 30 days.

(21) Appl. No.: 12/894,415

(22) Filed: Sep. 30, 2010

(65) Prior Publication Data

US 2012/0079803 A1 Apr. 5, 2012

(51) Int. Cl.
*B64G 1/40* (2006.01)

(52) U.S. Cl. .......................................... 60/204; 60/231

(58) Field of Classification Search .................... 60/228, 60/231, 242, 770, 771, 204; 239/265.17, 239/265.23
See application file for complete search history.

(56) References Cited

U.S. PATENT DOCUMENTS

| | | | | |
|---|---|---|---|---|
| 3,020,714 A | * | 2/1962 | Eggers et al. | 239/265.23 |
| 3,212,259 A | * | 10/1965 | Kepler | 60/231 |
| 3,574,475 A | * | 4/1971 | Wolff | 415/17 |
| 3,682,269 A | * | 8/1972 | Jumelle | 181/219 |
| 3,759,039 A | * | 9/1973 | Williams | 60/231 |
| 4,686,824 A | * | 8/1987 | Dunaway et al. | 60/231 |
| 5,894,990 A | | 4/1999 | Glezer et al. | |
| 6,308,740 B1 | | 10/2001 | Smith et al. | |
| 6,308,898 B1 | | 10/2001 | Dorris, III et al. | |
| 6,336,319 B1 | * | 1/2002 | Koshoffer | 60/770 |
| 6,470,669 B2 | * | 10/2002 | Jones et al. | 60/231 |
| 6,571,549 B1 | | 6/2003 | Stanek | |
| 7,055,329 B2 | | 6/2006 | Martens et al. | |
| 7,412,832 B2 | * | 8/2008 | Gutmark et al. | 60/770 |
| 7,509,797 B2 | * | 3/2009 | Johnson | 60/228 |
| 7,950,218 B2 | * | 5/2011 | Beutin et al. | 60/231 |
| 2004/0088967 A1 | * | 5/2004 | Webster et al. | 60/204 |
| 2005/0091963 A1 | | 5/2005 | Li | |
| 2006/0283188 A1 | | 12/2006 | Webster et al. | |

* cited by examiner

*Primary Examiner* — Phutthiwat Wongwian
(74) *Attorney, Agent, or Firm* — Reising Ethington P.C.; John J. Snyder

(57) ABSTRACT

An apparatus for reducing heating effects of an exhaust plume of a jet engine on an impinged surface includes fluid injectors disposed adjacent and aimed into an exhaust plume zone that's to be occupied by an exhaust plume when the engine is running. A flow generator transmits fluid flow into such an exhaust plume through the injectors. Each injector emits fluid in at least two divergent directions to increase the cross-sectional area of the exhaust plume by forming fluidic lobes in the exhaust plume.

23 Claims, 4 Drawing Sheets

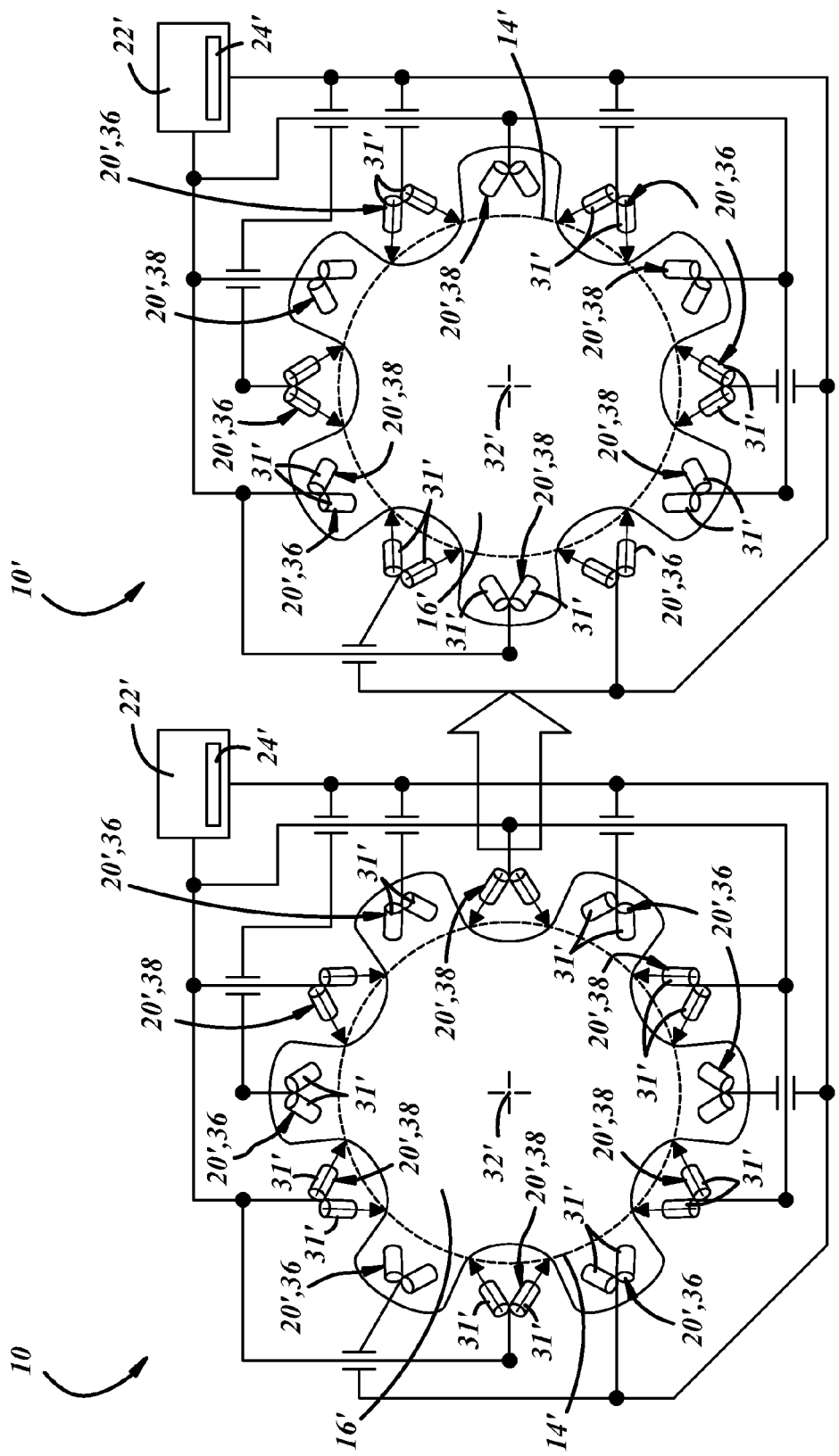

EXHAUST PLUME HEAT EFFECT REDUCING METHOD AND APPARATUS

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates generally to a method and apparatus for reducing heating effects of an exhaust plume on an impinged surface.

2. Description of the Related Art Including Information Disclosed Under 37 CFR 1.97 and 1.98

Jet engine exhaust plumes can have deleterious heat effects on impinged surfaces—especially where, as with VSTOL type aircraft, exhaust plumes are sometimes aimed directly downward onto ground or deck surfaces. Also, some aircraft have auxiliary power units that, when the aircraft is resting on the ground or a deck surface, may exhaust very hot low speed flow toward the ground or deck surface—even when a main propulsion jet of such an aircraft is not operating. Temperatures reached by the exhaust plumes from aircraft are quite high, typically upwards of 1,000 degrees F. In fact, when such a plume is directed downward, the high temperature will tend to melt tarmac, erode concrete, and heat metal plates to unacceptably high temperatures. VSTOL aircraft operations are often restricted, as a result, and take-off or landings often must be performed with some forward movement to reduce damage to runway and ramp surfaces.

The deleterious heat effects of an exhaust plume may be reduced by mixing ambient air with the exhaust plume. This has been done by pulsing air flow into the plume through injection nozzles in a way that causes the exhaust plume to "flap" back and forth, mixing with ambient air. Exhaust plumes have also been caused to mix with ambient air by pulsing a circumferentially-spaced array of radially-inwardly-directed air injection nozzles out of phase with one another. Air injection nozzles have also been positioned at converging angles towards the longitudinal axis of an exhaust plume to break up a shear boundary of the plume, causing the exhaust plume to engulf ambient air and introducing large scale vortices into a core of the exhaust plume. Both fan bypass air and compressor bleed air have been used as fluid sources to supply fluid injection nozzles in such systems.

To shorten the downstream distance at which personnel can work behind a running jet engine, zero-net-mass-flux (ZNMF) actuators have been used to inject fluid with zero net mass flow into a horizontal jet engine exhaust plume and then alternately turned on and off out-of-phase with one another to move the plume upward and downward in a "whipping" motion.

BRIEF SUMMARY OF THE DISCLOSURE

An apparatus is provided for reducing heating effects of an exhaust plume on an impinged surface. The apparatus may include an injector supportable in a position adjacent the exhaust nozzle of an engine and aimed into an exhaust plume zone that's occupied by an exhaust plume when the engine is running The apparatus may include a flow generator connected to and in fluid communication with the injector and configured to generate and transmit fluid flow through the injector into an exhaust plume occupying the exhaust plume zone. The injector is configured to emit fluid in at least two divergent directions into an exhaust plume emanating from the exhaust nozzle and occupying the exhaust plume zone.

The injector may be configured to inject fluid in at least two divergent fluid streams. The streams may be aimed divergently from one another at an angle in the range of between about 5 and 50 degrees The apparatus may include at least two injectors disposed at circumferentially-spaced locations around the exhaust nozzle and aimed into the exhaust plume zone. The flow generator may be connected to and in fluid communication with each injector and may be configured to generate fluid flow through each injector. Each injector may be configured to emit fluid in at least two divergent directions into the exhaust plume zone to increase the cross-sectional area of an exhaust plume emanating from the exhaust nozzle by cooperating with one another to form at least two fluidic lobes in the plume, and doing so without substantially moving the exhaust plume off its longitudinal axis. The divergent fluid flow from each injector creates a more pronounced lobing effect in an exhaust plume, which has been empirically shown to further reduce exhaust plume temperatures. The apparatus may include six such injectors arranged to form six fluidic lobes in the plume.

The flow generator may include a pulse generator connected to and in fluid communication with each injector. The pulse generator may be configured to generate and transmit fluid pulses into the plume zone through the injectors.

The injectors may be disposed at diametrically opposite locations around the plume zone to maintain an exhaust plume on a generally axial orientation rather than sweeping the plume off axis. The pulse generator may be configured to actuate diametrically-opposed injectors either in-phase to further cool an exhaust plume by forming vortical structures that penetrate the exhaust plume's thermal core, or out-of-phase to cool the exhaust plume by sweeping it back and forth off axis, causing the exhaust heat flux to be spread over a wider area.

The pulse generator may be configured to actuate circumferentially alternating sets of diametrically opposed injectors in-phase, to improve mixing by alternating the circumferential positions of fluidic lobes formed by the injectors in an exhaust plume.

The pulse generator and injectors may be configured to pulse fluid via positive mass flux. Where positive mass flux is employed, the pulse generator may include a pulsing valve connected to a compressor section of an engine. Alternatively, the pulse generator and injector may be configured to pulse fluid via zero-net-mass-flux. Where zero-net-mass-flux is employed, the pulse generator may include a piston or oscillatory diaphragm at least partially enclosed in a chamber with the piston or diaphragm being actuable to change the chamber's internal volume to cyclically draw in closely surrounding ambient air and then eject it forcefully in a specified direction.

A method is provided for reducing heating effects of an exhaust plume on an impinged surface. According to this method one can reduce heating effects of an exhaust plume on an impinged surface by providing a rocket or jet engine having an exhaust nozzle configured to direct an exhaust plume from the engine into a plume zone, providing a fluid injector in a position aimed into the exhaust plume zone, operating an engine to emit an exhaust plume into the exhaust plume zone, and emitting fluid into the exhaust plume in at least two divergent directions from the injector.

The step of emitting fluid into the exhaust plume zone may include emitting the fluid downstream at a depression angle in the range of approximately 30 to 50 degrees measured from a plane parallel to the exhaust nozzle exit plane.

The step of emitting fluid into the exhaust plume may include emitting the fluid in at least two fluid streams diverging from one another at an angle in the range of between about 5 and 50 degrees.

The step of providing a fluid injector may include providing a plurality injectors at circumferentially-spaced locations around the exhaust nozzle and aimed into the exhaust plume zone, and the step of emitting fluid may include pulsing fluid into the plume in at least two divergent directions from each injector.

The step of providing a plurality of injectors may include providing the injectors at diametrically opposite locations around and aimed into the exhaust plume zone, and the step of pulsing fluid into the exhaust plume may include operating diametrically opposed injectors either in-phase or out-of-phase.

The step of providing a plurality of injectors may include arraying the injectors into two circumferentially alternating sets of injectors disposed at circumferentially spaced locations around the exhaust nozzle. The sets of injectors may be operated in an alternating fashion to further cool the exhaust plume by altering the plume's cross-section over time and enhancing mixing with ambient air.

Finally, the step of pulsing fluid into the exhaust plume may include operating the injectors via positive mass flux or via zero-net-mass-flux.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 5 is a schematic cross-sectional view of an exhaust plume heat effect reducing apparatus constructed according to a second embodiment and comprising two sets of six fluid injection port pairs with a first of the two sets of six fluid injection port pairs shown forming six fluidic lobes in 2, 4, 6, 8, 10, and 12 o'clock positions around the jet exhaust plume;

FIG. 6 is a second schematic cross-sectional view of the apparatus of FIG. 5 with a second of the two sets of six fluid injection port pairs shown forming six fluidic lobes in 1, 3, 5, 7, 9, and 11 o'clock positions around the jet exhaust plume.

DETAILED DESCRIPTION OF INVENTION EMBODIMENT(S)

Figure 1:
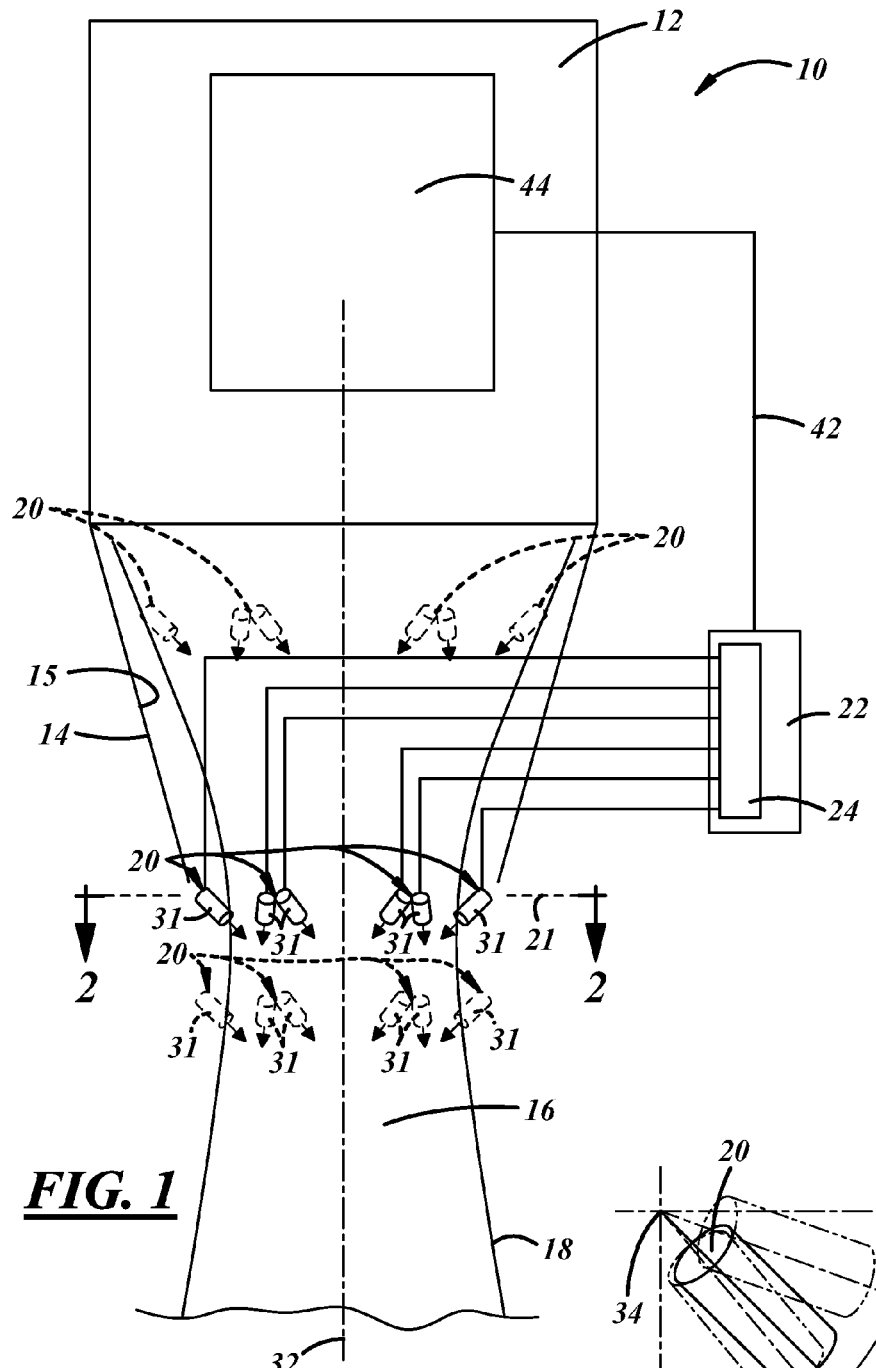
FIG. 1 is a schematic front view of an exhaust plume heat effect reducing apparatus constructed according to one embodiment and comprising an array of six injection port pairs surrounding an exhaust plane of a jet engine, with two alternate installation locations for the six injection port pairs shown in phantom.
Figure 3:
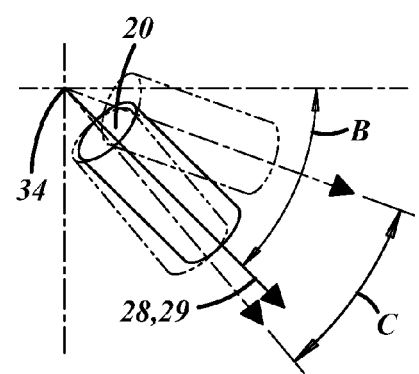
FIG. 3 is a magnified view of one of the injection port pairs taken along line 3-3 of FIG. 2 and shown at a depression angle of 45 degrees and further showing, in phantom, a range of alternate depression angles of 30 to 50 degrees.
Figure 2:
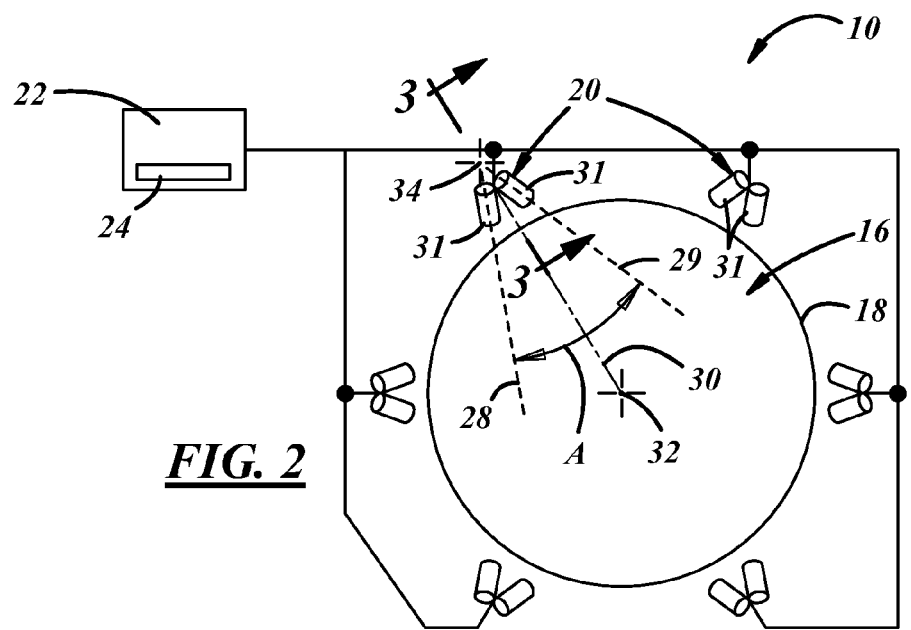
FIG. 2 is a schematic cross-sectional view of the exhaust plume heat effect reducing apparatus and exhaust plume taken along line 2-2 of FIG. 1 and showing the six fluid injection port pairs of the apparatus spaced around and aimed into the exhaust plume.
Figure 4:
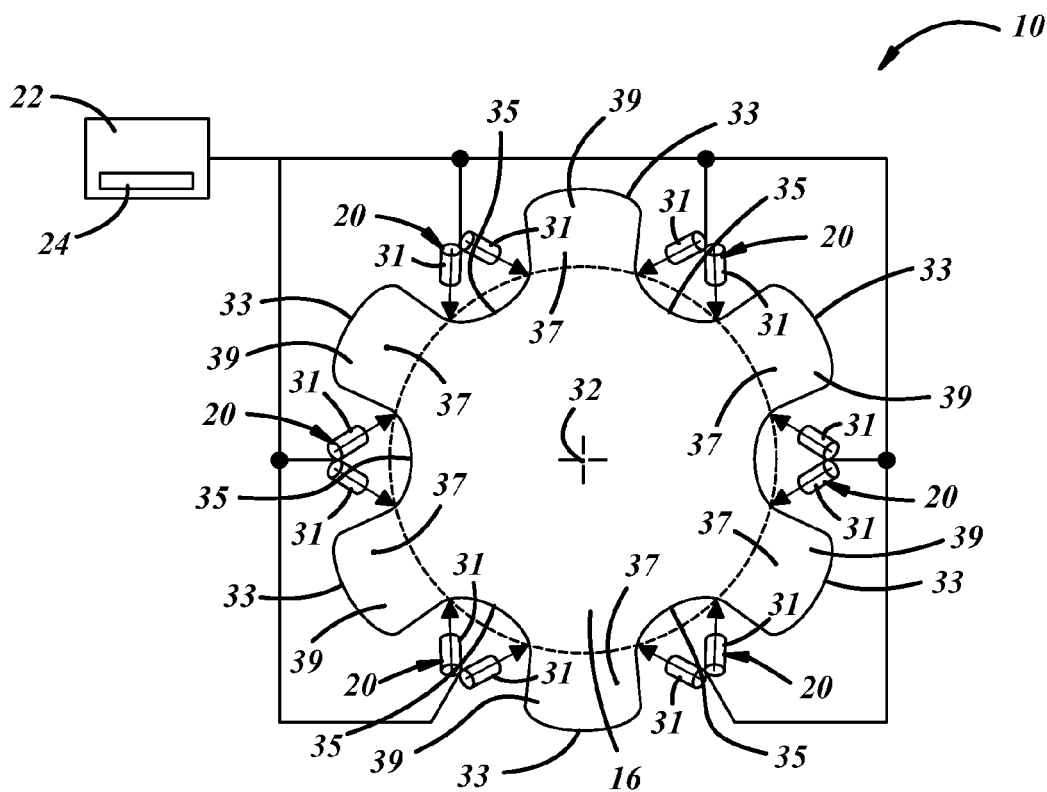
FIG. 4 is a schematic cross-sectional view of the apparatus of FIG. 1 taken along line 2-2 of FIG. 1 and showing the six fluid injection port pairs directing steady flows of fluid and forming fluidic lobes in the exhaust plume.

An apparatus for reducing heating effects of an exhaust plume on an impinged surface is generally shown at 10 in FIGS. 1, 2, and 4. A second embodiment is generally shown at 10' in FIGS. 5 and 6. Reference numerals with the designation prime (') in FIGS. 5 and 6 indicate alternative configurations of elements that also appear in the first embodiment. Unless indicated otherwise, where a portion of the following description uses a reference numeral to refer to FIGS. 1-4, that portion of the description applies equally to elements designated by primed numerals in FIGS. 5 and 6.

As shown in FIG. 1, the apparatus 10 may include a rocket or jet engine 12 having an exhaust nozzle 14 configured to direct an exhaust plume 16 from the engine 12 into an exhaust plume zone 18. Injectors 20 may be disposed adjacent a nozzle exit plane 21 of the exhaust nozzle 14 and supported in respective positions that allow them to be aimed into the exhaust plume zone 18.

The exhaust plume zone 18 is defined as being a volume of space that is occupied by an exhaust plume 16 emanating from the engine 12 when the engine is running. The shape and position of the exhaust plume zone 18 is thus defined as being whatever the shape and position of such an exhaust plume 16 would be while the engine 12 is operating.

The injectors 20 may be installed upstream of the exit plane 21 of the nozzle 14 on the nozzle's inner mold line 15, at the exit plane 21 of the nozzle (as in the present embodiment), or downstream from the nozzle exit plane 21. In FIG. 1 the optional upstream and downstream positions of the injectors 20 are shown in phantom.

The injectors are configured to emit fluid into the exhaust plume zone in at least two divergent directions. To provide divergent fluid flow, the injectors may include respective pairs of control jets or fluid injection ports. However, in other embodiments, the injectors may be configured to emit fluid in divergent directions in, for example, a single fan-shaped stream.

As shown in FIGS. 1, 2, and 4 the apparatus 10 may also include a flow generator 22 that may be connected to and may be in fluid communication with each injector 20. The flow generator 22 may be configured to receive fluid from a fluid source such as the compressor section 44 of an engine 12 as shown in FIG. 1, and may be configured to generate and transmit fluid flow through the injectors 20 and into an exhaust plume 16 occupying the plume zone 18.

The injectors 20 may be configured to emit fluid in at least two divergent directions via respective divergent fluid streams to increase the cross-sectional area of an exhaust plume 16 emanating from the exhaust nozzle 14 as shown in FIG. 4. As shown in FIG. 2, each injector 20 may be configured to emit fluid streams aimed divergently from one another forming a divergence angle A bisected by a line 30 intersecting and extending between a longitudinal exhaust nozzle/plume axis 32 (parallel to the general direction of exhaust plume gas flow) and a point of divergence 34 of imaginary lines extending along the divergent fluid streams. In the present embodiment the point of divergence 34 is also a point of actual intersection of the imaginary lines. However, in other embodiments, the point of divergence 34 need not be an exact point of intersection. The divergence angle A of the two fluid streams emitted by each injector 20 may be between about 5 and 50 degrees.

As shown in FIGS. 1 and 3, each injector 20 may be configured to direct the divergent fluid streams downstream relative to the flow of exhaust plume gases. More specifically, the injectors 20 may be configured to direct the fluid streams such that a stream plane defined by the divergent fluid streams is disposed at a depression angle B of approximately 45 degrees measured downstream from a plane parallel to the exhaust nozzle exit plane 21. The stream plane of an injector 20 is defined by respective stream axes 28, 29 of the divergent streams. In other words, the stream axes 28, 29 of an injector 20 lie in and define the stream plane of that injector 20. As shown in FIGS. 2 and 3, the stream plane of each injector 20 may be depressed at any angle between zero and 90 degrees from a plane parallel to the exhaust nozzle plane 21, but preferably at an angle in the range C of about 30 to 50 degrees measured from a plane parallel to the exhaust nozzle exit plane 21 as shown in FIG. 3.

As best shown in FIGS. 1-3, the apparatus 10 may include six injectors 20 disposed at equally-spaced circumferential locations around, and aimed into, the exhaust plume zone 18. The flow generator 22 may be connected to and may be in fluid communication with each of the six injectors 20, and may be configured to generate fluid flow through each of the six injectors 20. The fluid may be emitted from each of the injectors 20 in a least two divergent directions into the exhaust plume zone. Each injector 20 may include two ports 31 that may be aimed divergently from one another, forming an angle bisected by lines intersecting and extending between the jet exhaust nozzle/plume axis 32 and the point of divergence of imaginary stream axis lines passing through the injector 20. Each of the six injectors 20 may be configured to generate its divergent fluid streams in a stream plane depressed or angled downstream such that respective stream planes of the injectors 20 are disposed at respective depression angles in the range of between about 30 and 50 degrees and, in the present embodiment, approximately 45 degrees from a plane parallel to the exhaust nozzle exit plane 21.

The divergent fluid streams from the six injectors 20 increase the cross-sectional area of an exhaust plume 16 emanating from the exhaust nozzle 14 by cooperating to form six circumferentially-spaced radially-extending fluidic lobes 33 in the exhaust plume 16, and doing so without moving the exhaust plume 16 significantly off its longitudinal axis 32. By expanding troughs 35 between the fluidic lobes 33 the divergence of the fluid streams from each injector 20 creates a more pronounced lobing effect in an exhaust plume. In other words, lobe necks 37 become narrower as lobe heads 39 become larger.

Injectors 20 may be disposed at diametrically opposite locations around the plume zone 18 (i.e., in diametrical opposition to one another relative to the exhaust nozzle/plume axis 32), and operated in opposition to one another to maintain the exhaust plume 16 on a generally axial orientation rather than sweeping the plume 16 off axis. However, other embodiments may include more or less than six exhaust injectors 20 and they need not be mounted in diametric opposition.

As is also shown in FIGS. 1-3, the flow generator 22 may include a pulse generator 24 that may be connected to and in fluid communication with each port 31 of the six injectors 20. The pulse generator 24 may be configured to generate and transmit fluid pulses into the exhaust plume zone 18 through the six injectors 20. The pulsed actuation of the injectors 20 introduces small air perturbations into a shear layer of the exhaust plume 16. The perturbations disrupt the shear layer, enhancing mixing of the exhaust plume 16 with surrounding free stream air. It also increases viscous entrainment effects and results in greater amounts of cooler surrounding air being drawn into the exhaust plume 16.

As shown in FIGS. 5 and 6, the apparatus 10 may include twelve injectors 20' arrayed in two circumferentially alternating sets 36, 38 of six injectors 20' disposed at circumferentially equally-spaced locations around the exhaust nozzle 14'. The pulse generator 24' may be configured to actuate both sets 36, 38 of injectors 20' at the same time. Alternatively, the pulse generator 24' may be configured to actuate the circumferentially alternating sets 36, 38 of diametrically opposed injectors 20' in an alternating fashion with the pulse generator 24' alternating between pulsing all six injectors 20' of the a first set 36 of six injectors 20' and then pulsing all six injectors 20' of a second set 38 of six injectors 20'. The alternating pulsation of the two sets 36, 38 of injectors 20' causes the exhaust plume 16' to alternate over time between two fluidic lobed patterns—one formed by the first set 36 of six injectors 20' as shown in FIG. 5, and the other formed by the second set of six injectors 20' as shown in FIG. 6.

The pulse generator 24 may be configured to actuate diametrically-opposed injectors 20 in-phase, i.e., at the same time, to further cool an exhaust plume 16 by forming vortical structures that penetrate the exhaust plume's thermal core. Alternatively, the pulse generator 24 may be configured to actuate diametrically-opposed injectors 20 out-of-phase (i.e., in an alternating fashion so that the exhaust plume 16 is cooled by sweeping it back and forth off axis 32), causing the exhaust heat flux to be spread over a wider area. Unsteady actuation of diametrically-opposed injectors 20, whether in-phase or out-of-phase, has been empirically shown to significantly reduce the temperature of an exhaust plumes thermal core.

The pulse generator 24 and injectors 20 may be configured to pulse fluid via positive mass flux or may alternatively be configured to pulse fluid via zero-net-mass-flux (ZNMF). Where the pulse generator 24 and injectors 20 are configured for ZNMF, the injectors 20 may comprise actuators capable of pulsing fluid via ZNMF.

To produce positive mass flux, the pulse generator 24 may include a plurality of pulsing valves or any other suitable air pulsing means, and may be connected via a compressor air bleed line 42 to a compressor section 44 of the engine 12 as shown in FIG. 1. To produce ZNMF, the pulse generator 24 may include a piston or oscillatory diaphragm at least partially enclosed in a chamber located near the exhaust nozzle 14. The piston or diaphragm may be actuated to change the chamber's internal volume to cyclically draw in closely surrounding ambient air and then eject it forcefully in a specified direction as is known in the art.

Figure 7:
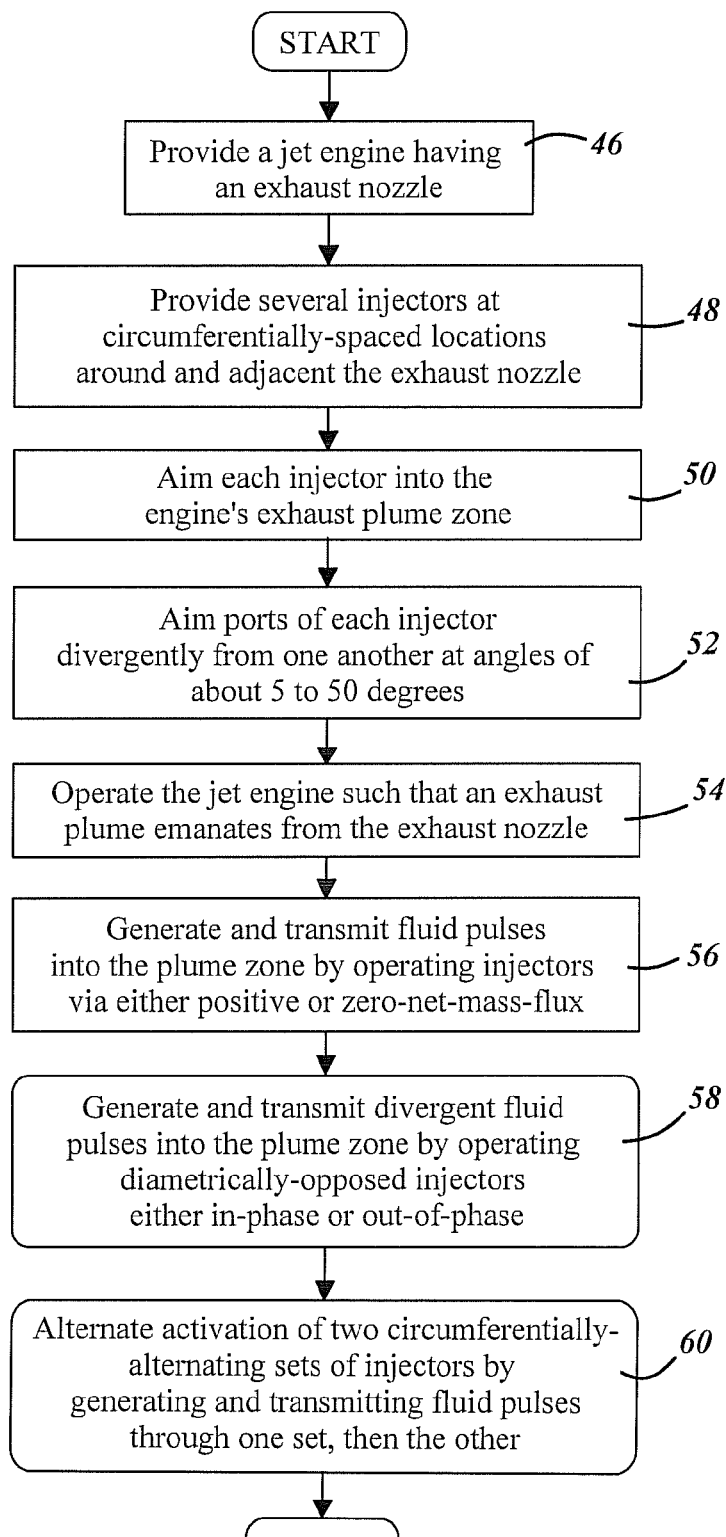
FIG. 7 is a flow chart showing a method for reducing heating effects of an exhaust plume on an impinged surface.

In practice, and as shown in FIG. 7, heating effects of an exhaust plume emanating from an exhaust nozzle of a rocket or jet engine onto an impinged surface can be reduced by providing an engine having an exhaust nozzle as indicated in action step 46, supporting fluid injectors in circumferentially-spaced locations adjacent to the exit plane of an exhaust nozzle of the engine as indicated in action step 48, and aiming the injectors into an exhaust plume zone occupied by an exhaust plume when the engine is operating as indicated in action step 50. Each injector may include a pair of ports 31 that may be aimed divergently from one another forming an angle bisected by a line extending between the jet exhaust nozzle/plume axis and a point of divergence of the pair of fluid injection ports 31. As indicated in action step 52, the two ports 31 of each injector may be aimed away from one another at an angle of between about 5 and 50 degrees. The pair of ports 31 of each injector may be depressed or angled downstream such that a stream plane defined by fluid streams emitted from each injector is disposed at a depression angle of between about 30 and 50 degrees and, in the present embodiment, approximately 45 degrees from a plane parallel to the exhaust nozzle exit plane.

With the engine 12 operating and emitting an exhaust plume 16 into the exhaust plume zone 18 as indicated in action step 54, divergent fluid flows and/or pulses may be generated and directed in at least two divergent directions from each injector 20 into the exhaust plume zone 18. Where two or more injectors 20 are disposed in diametrically-opposed positions, the diametrically-opposed injectors 20 may be activated either in-phase, or out-of-phase as indicated in action step 56. In other words, injectors 20 disposed in diametrically opposite positions may be operated either at the same time or in an alternating fashion. As indicated in action step 58, these divergent fluid pulses may be generated and transmitted through the injectors 20 either via positive mass flux or ZNMF.

Where two circumferentially alternating sets 36, 38 of fluid injectors 20' are disposed or arrayed at circumferentially spaced locations around the exhaust nozzle 14' as shown in FIGS. 5 and 6, the two circumferentially alternating sets 36, 38 of injectors 20' may be actuated either at the same time or in an alternating fashion. When actuated in an alternating fashion as indicated in action step 60, all the injectors 20' of the a first set 36 of injectors 20' are pulsed together and then all the injectors 20' of the second set 38 of injectors 20' are pulsed together and the process is repeated.

An apparatus constructed as indicated above will cool a plume of hot exhaust by spreading the plume into lobes via pairs of fluid injection ports 31. Further cooling may be achieved by pulsing and alternating operation of the injection ports 31 so as to vary the shape and texture of the plume over time, further reducing the plume's heat signature and preventing damage to surfaces impinged by the exhaust plume.

This description, rather than describing limitations of an invention, only illustrates embodiments of the invention recited in the claims. The language of this description is therefore exclusively descriptive and is non-limiting.

Obviously, it's possible to modify this invention from what the description teaches. Within the scope of the claims, one may practice the invention other than as described above.

What is claimed is:

1. An exhaust plume heat effect reducing apparatus comprising:
    an injector comprises at least two ports supportable in a position adjacent an exhaust nozzle of an engine and aimed into an exhaust plume zone that is occupied by an exhaust plume when the engine is running;
    a flow generator connected to and in fluid communication with the injector and configured to generate and transmit fluid flow through the injector into the exhaust plume zone;
    the injector being configured to simultaneously emit fluid in at least two divergent directions into an exhaust plume emanating from the exhaust nozzle and occupying the exhaust plume zone.

2. An exhaust plume heat effect reducing apparatus as defined in claim 1 in which the injector is configured to generate fluid streams through respective ports, which diverge from one another at an angle in the range of between about 5 and 50 degrees.

3. An exhaust plume heat effect reducing apparatus as defined in claim 1 in which the injector is configured to generate the divergent fluid streams in a stream plane depressed at an angle in the range of about 30 to 50 degrees measured from a plane parallel to an exhaust nozzle exit plane.

4. An exhaust plume heat effect reducing apparatus as defined in claim 3 in which the injector is configured to generate the divergent fluid streams in a stream plane depressed at an angle of approximately 45 degrees measured from a plane parallel to the exhaust nozzle exit plane.

5. An exhaust plume heat effect reducing apparatus comprising:
    at least two injectors supported adjacent an exhaust nozzle of an engine and aimed into an exhaust plume zone that is occupied by an exhaust plume when the engine is running, the injectors being disposed at circumferentially-spaced locations around the exhaust plume zone and aimed into the exhaust plume zone;
    a flow generator connected to and in fluid communication with each injector and configured to generate fluid flow through each injector; and
    each injector comprising at least two ports configured to emit respective fluid streams in at least two divergent directions into the exhaust plume zone.

6. An exhaust plume heat effect reducing apparatus as defined in claim 5 in which the flow generator includes a pulse generator connected to and in fluid communication with each injector and is configured to generate and transmit fluid pulses into the plume zone through the injectors.

7. An exhaust plume heat effect reducing apparatus as defined in claim 6 in which the injectors are disposed at diametrically opposite locations around the plume zone.

8. An exhaust plume heat effect reducing apparatus as defined in claim 7 in which the pulse generator is configured to actuate diametrically-opposed injectors at the same time.

9. An exhaust plume heat effect reducing apparatus as defined in claim 8 in which the pulse generator is configured to actuate circumferentially alternating diametrically opposed injectors at the same time.

10. An exhaust plume heat effect reducing apparatus as defined in claim 7 in which the pulse generator is configured to actuate diametrically-opposed injectors in an alternating fashion.

11. An exhaust plume heat effect reducing apparatus as defined in claim 6 in which the pulse generator and injectors are configured to pulse fluid via positive mass flux.

12. An exhaust plume heat effect reducing apparatus as defined in claim 11 in which the pulse generator includes a pulsing valve connected to a compressor section of a jet engine.

13. An exhaust plume heat effect reducing apparatus as defined in claim 6 in which:
    at least one of the injectors includes at least one zero-net-mass flux actuator; and
    the pulse generator and the at least one injector are configured to pulse fluid into the plume zone via the at least one zero-net-mass-flux actuator.

14. A method for reducing heating effects of an exhaust plume on an impinged surface, the method including the steps of:
    providing a jet engine having an exhaust nozzle configured to direct an exhaust plume from the engine into an exhaust plume zone;
    providing a fluid injector comprises at least two ports in a position aimed into the exhaust plume zone;
    operating the engine to emit an exhaust plume into the exhaust plume zone; and
    emitting fluid into the exhaust plume in at least two divergent directions from the injector.

15. The method of claim 14 in which the step of emitting fluid into the exhaust plume includes emitting the fluid downstream at a depression angle in the range of approximately 30 to 50 degrees measured from a plane parallel to an exit plane of the exhaust nozzle.

16. The method of claim 15 in which the step of emitting fluid into the exhaust plume includes emitting the fluid downstream at a depression angle of about 45 degrees measured from a plane parallel to the exhaust nozzle exit plane.

17. The method of claim 14 in which the step of emitting fluid into the exhaust plume includes emitting the fluid in at least two fluid streams diverging from one another at an angle in the range of between about 5 and 50 degrees.

18. The method of claim 14 in which:
the step of providing a fluid injector includes providing a plurality of injectors at circumferentially-spaced locations adjacent and around and aimed into the exhaust plume zone; and
the step of emitting fluid includes pulsing fluid into the exhaust plume in at least two divergent directions from each injector.

19. The method of claim 18 in which:
the step of providing a plurality of injectors includes providing the injectors at diametrically opposite locations around and aimed into the exhaust plume zone; and
the step of pulsing fluid into the exhaust plume includes operating diametrically opposed injectors in-phase.

20. The method of claim 18 in which:
the step of providing a plurality of injectors includes providing the injectors at diametrically opposite locations around and aimed into the exhaust plume zone; and
the step of pulsing fluid into the exhaust plume includes operating diametrically opposed injectors out-of-phase.

21. The method of claim 18 in which:
the step of providing a plurality of injectors includes arraying the injectors in first and second circumferentially alternating sets of injectors disposed at circumferentially spaced locations around the exhaust nozzle; and
the step of pulsing fluid into the exhaust plume includes alternately actuating the first and second circumferentially alternating sets of injectors.

22. The method of claim 18 in which the step of pulsing fluid into the exhaust plume includes operating the injectors via positive mass flux.

23. The method of claim 18 in which the step of generating and transmitting divergent fluid pulses into the exhaust plume zone includes operating the injectors via zero-net-mass flux.

* * * * *